US 12,355,978 B2

United States Patent
Gao et al.

(10) Patent No.: US 12,355,978 B2
(45) Date of Patent: Jul. 8, 2025

(54) ENHANCEMENT PROCESS FOR VIDEO CODING FOR MACHINES

(71) Applicant: TENCENT AMERICA LLC, Palo Alto, CA (US)

(72) Inventors: Wen Gao, West Windsor, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 61 days.

(21) Appl. No.: 18/076,020

(22) Filed: Dec. 6, 2022

(65) Prior Publication Data

US 2023/0269378 A1 Aug. 24, 2023

Related U.S. Application Data

(60) Provisional application No. 63/313,616, filed on Feb. 24, 2022.

(51) Int. Cl.
*H04N 19/147* (2014.01)
*H04N 19/177* (2014.01)

(52) U.S. Cl.
CPC ......... *H04N 19/147* (2014.11); *H04N 19/177* (2014.11)

(58) Field of Classification Search
CPC .. H04N 19/147; H04N 19/177; H04N 19/172; H04N 19/85; H04N 19/46; H04N 19/103; H04N 19/19
See application file for complete search history.

(56) References Cited

U.S. PATENT DOCUMENTS

| 11,153,566 B1* | 10/2021 | Tao ..................... H04N 19/124 |
| 2012/0219229 A1* | 8/2012 | Springer ............... G06T 3/4053 |
| | | 382/199 |

(Continued)

FOREIGN PATENT DOCUMENTS

| CN | 113711594 A | 11/2021 | |
| EP | 4006773 A1 * | 6/2022 | ......... G06K 9/00362 |

(Continued)

OTHER PUBLICATIONS

International Search Report issued May 11, 2023 in counterpart Intl. App. No. PCT/US23/10174.

(Continued)

*Primary Examiner* — Shawn S An
(74) *Attorney, Agent, or Firm* — Sughrue Mion, PLLC

(57) ABSTRACT

Systems, devices, and methods for performing video coding for machine (VCM) image enhancement, including obtaining a coded image from a coded bitstream; obtaining enhancement parameters corresponding to the coded image; decoding the coded image using a VCM decoding module to generate a decoded image; generating an enhanced image using an enhancement module based on the decoded image and the enhancement parameters, wherein the enhancement parameters are optimized for one of a human vision VCM task, a machine vision VCM task, and a human-machine hybrid vision VCM task; providing at least one of the decoded image and the enhanced image to at least one of a human vision module and a machine vision module for performing the one of the human vision VCM task, the machine vision VCM task, and the human-machine hybrid vision VCM task.

13 Claims, 9 Drawing Sheets

(56) References Cited

U.S. PATENT DOCUMENTS

| | | | |
|---|---|---|---|
| 2014/0085415 A1* | 3/2014 | Bici | H04N 19/597 348/43 |
| 2017/0295382 A1 | 10/2017 | Su et al. | |
| 2019/0141324 A1* | 5/2019 | Bjorklund | H04N 19/176 |
| 2019/0295228 A1* | 9/2019 | Liu | G06T 5/60 |
| 2020/0169743 A1* | 5/2020 | Minoo | H04N 19/33 |
| 2020/0186810 A1* | 6/2020 | Zheludkov | H04N 19/124 |
| 2021/0314573 A1* | 10/2021 | Zhang | H04N 19/50 |
| 2021/0344957 A1* | 11/2021 | Lim | H04N 19/46 |
| 2021/0377554 A1* | 12/2021 | Kim | H04N 19/136 |
| 2022/0014447 A1 | 1/2022 | Kuo et al. | |
| 2022/0108127 A1* | 4/2022 | Choi | G06V 10/763 |
| 2022/0121871 A1* | 4/2022 | Peng | G06N 3/08 |
| 2022/0210435 A1* | 6/2022 | Kang | H04N 19/196 |
| 2022/0256227 A1* | 8/2022 | Rezazadegan Tavakoli | G16H 50/50 |
| 2023/0196072 A1* | 6/2023 | Zou | G06N 3/0495 706/22 |
| 2024/0333923 A1* | 10/2024 | Kim | H04N 19/14 |

FOREIGN PATENT DOCUMENTS

| | | |
|---|---|---|
| WO | 2021/193775 A1 | 9/2021 |
| WO | 2021/205067 A1 | 10/2021 |

OTHER PUBLICATIONS

Written Opinion issued May 11, 2023 in counterpart Intl. App. No. PCT/US23/10174.

Zhou Wang et al. Multi-Scale Structural Similarity for Image Quality Assessment, The 37th IEEE Asilomar Conference on Signals, Systems and Computers, Nov. 9-12, 2003, 5 pages, Pacific Grove, CA.

M. Rafie et al., Call for Evidence for Video Coding for Machines, WG 2 MPEG Technical requirements, Oct. 16, 2020, 12 pages, Serial No. 19844.

M. Rafie et al., Evaluation Framework for Video Coding for Machines, WG 2 MPEG Technical requirements, Oct. 16, 2020, 50 pages, Serial No. 19843.

Yuan Zhang et al., Use cases and requirements for Video Coding for Machines, WG 2 MPEG Technical requirements, Oct. 16, 2020, 21 pages, Serial No. 19841.

Communication dated Apr. 14, 2025 in Japanese Application No. 2023-564596.

Honglei Zhang (Nokia) et al., "[VCM] Enhancing Image Coding for Machines with Compressed Feature Residuals", ISO/IEC JTC 1/SC 29/WG 2m58072, 2021, pp. 1-5 (5 pages total).

Extended European Search Report dated May 16, 2025 from the European Patent Office in Application No. 23754093.5.

Supplementary European Search Report dated Jun. 4, 2025 from the European Patent Office in Application No. 23754093.5.

* cited by examiner

| Image 1 Bitstream | Image 1 metadata | Image 2 Bitstream | Image 2 metadata | ... | Image k Bitstream | Image k metadata |

FIG. 7A

| Image 1 Bitstream | F=1 | Image 1 metadata | Image 2 Bitstream | F=0 | Image 3 Bitstream | ... | Image k bitstream | F=1 |

FIG. 7B

| Image 1 Bitstream | Image 2 metadata | Image 3 metadata | Image 4 metadata | ... | Image k metadata | Image k+1 metadata |

FIG. 7C

| F=1 | Image 1 metadata | F=0 | F=1 | Image 3 metadata | ... | F=1 | Image k metadata | F=0 |

FIG. 7D

ENHANCEMENT PROCESS FOR VIDEO CODING FOR MACHINES

CROSS-REFERENCE TO RELATED APPLICATION

This application claims priority from U.S. Provisional Application No. 63/313,616, filed on Feb. 24, 2022, in the United States Patent and Trademark Office, the disclosure of which is incorporated herein by reference in its entirety.

FIELD

Embodiments of this disclosure are directed to video coding, and more particularly image enhancement consistent with video coding for machines (VCM).

BACKGROUND

Video or images may be consumed by human users for a variety of purposes, for example entertainment, education, etc. Thus, video coding or image coding may often utilize characteristics of human visual systems for better compression efficiency while maintaining good subjective quality.

With the rise of machine learning applications, along with the abundance of sensors, many intelligent platforms have utilized video for machine vision tasks such as object detection, segmentation or tracking. As a result, encoding video or images for consumption by machine tasks has become an interesting and challenging problem. This has lead to the introduction of Video Coding for Machines (VCM) studies. To achieve this goal, the international standard group MPEG has created an Ad-Hoc group, "Video coding for machines (VCM)" to standardize related techniques for better interoperability among difference devices.

Existing VCM methods may be optimized for certain class of video contents. For example, in some implementations of VCM, for example either learning-based or hand-crafted implementations, may be trained or optimized using a set of image/video datasets. However, in actual encoding operation, an individual image/video may have its own characteristics, which may deviate from the characteristics of the training image/video dataset. Thus, there may be a need for further enhancement of the decoded images/videos.

SUMMARY

In accordance with an aspect of the disclosure, a method of performing video coding for machine (VCM) image enhancement is executed by at least one processor includes obtaining a coded image from a coded bitstream; obtaining enhancement parameters corresponding to the coded image; decoding the coded image using a VCM decoding module to generate a decoded image; generating an enhanced image using an enhancement module based on the decoded image and the enhancement parameters, wherein the enhancement parameters are optimized for one of a human vision VCM task, a machine vision VCM task, and a human-machine hybrid vision VCM task; providing at least one of the decoded image and the enhanced image to at least one of a human vision module and a machine vision module for performing the one of the human vision VCM task, the machine vision VCM task, and the human-machine hybrid vision VCM task.

In accordance with an aspect of the disclosure, a device for performing video coding for machine (VCM) image enhancement includes at least one memory configured to store program code; and at least one processor configured to read the program code and operate as instructed by the program code, the program code including: first obtaining code configured to cause the at least one processor to obtain a coded image from a coded bitstream; second obtaining code configured to cause the at least one processor to obtain enhancement parameters corresponding to the coded image; decoding code configured to cause the at least one processor to decode the coded image using a VCM decoding module to generate a decoded image; first generating code configured to cause the at least one processor to generate an enhanced image using an enhancement module based on the decoded image and the enhancement parameters, wherein the enhancement parameters are optimized for one of a human vision VCM task, a machine vision VCM task, and a human-machine hybrid vision VCM task; and providing code configured to cause the at least one processor to provide at least one of the decoded image and the enhanced image to at least one of a human vision module and a machine vision module for performing the one of the human vision VCM task, the machine vision VCM task, and the human-machine hybrid vision VCM task.

In accordance with an aspect of the disclosure, a non-transitory computer-readable medium stores instructions, the instructions including: one or more instructions that, when executed by one or more processors of a device for video coding for machine (VCM) image enhancement, cause the one or more processors to: obtain a coded image from a coded bitstream; obtain enhancement parameters corresponding to the coded image; decode the coded image using a VCM decoding module to generate a decoded image; generate an enhanced image using an enhancement module based on the decoded image and the enhancement parameters, wherein the enhancement parameters are optimized for one of a human vision VCM task, a machine vision VCM task, and a human-machine hybrid vision VCM task; and and provide at least one of the decoded image and the enhanced image to at least one of a human vision module and a machine vision module for performing the one of the human vision VCM task, the machine vision VCM task, and the human-machine hybrid vision VCM task.

BRIEF DESCRIPTION OF THE DRAWINGS

Further features, the nature, and various advantages of the disclosed subject matter will be more apparent from the following detailed description and the accompanying drawings in which:

FIGS. 7A through 7D are diagrams illustrating examples of bitstreams, according to embodiments.

DETAILED DESCRIPTION

Figure 1:
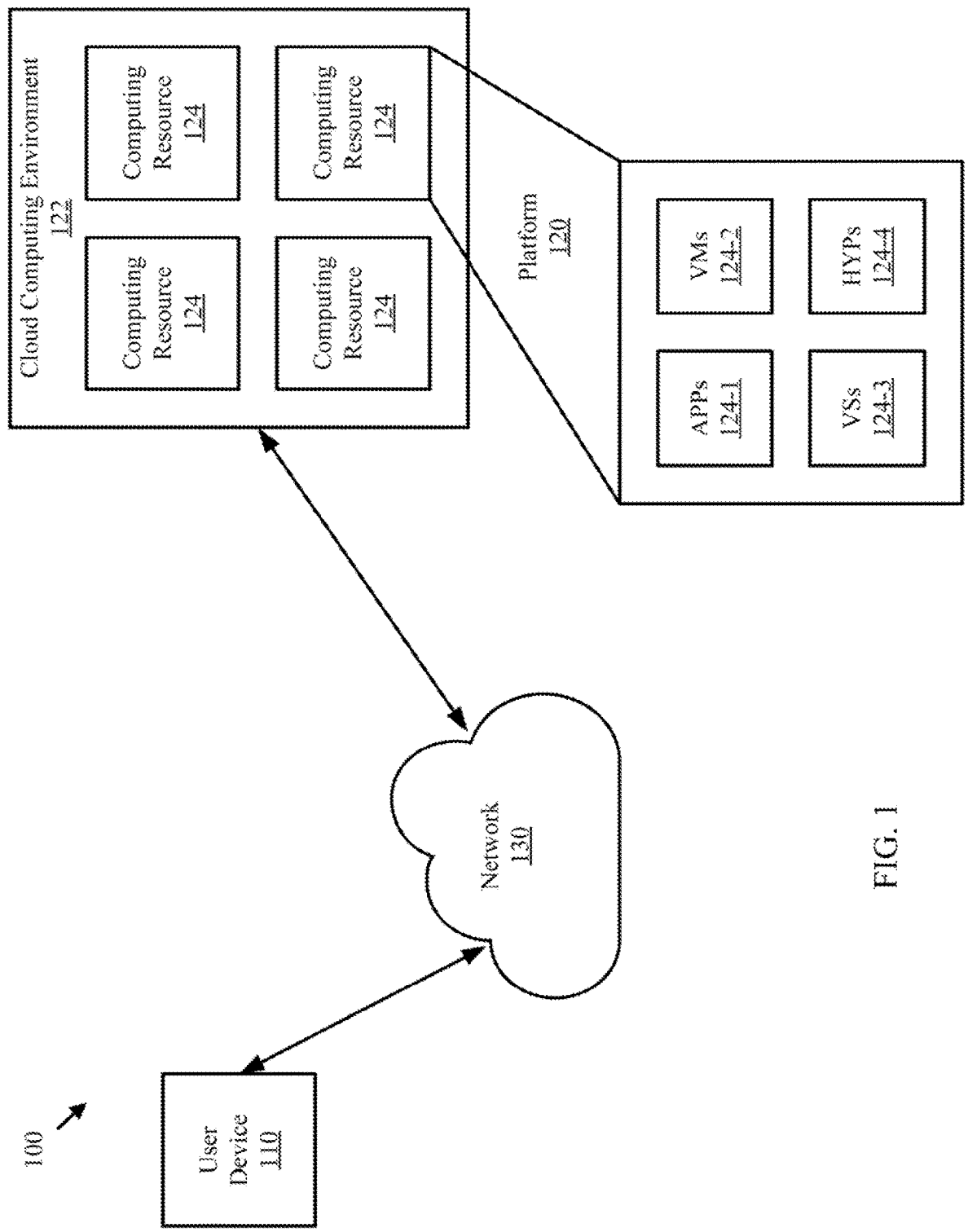
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
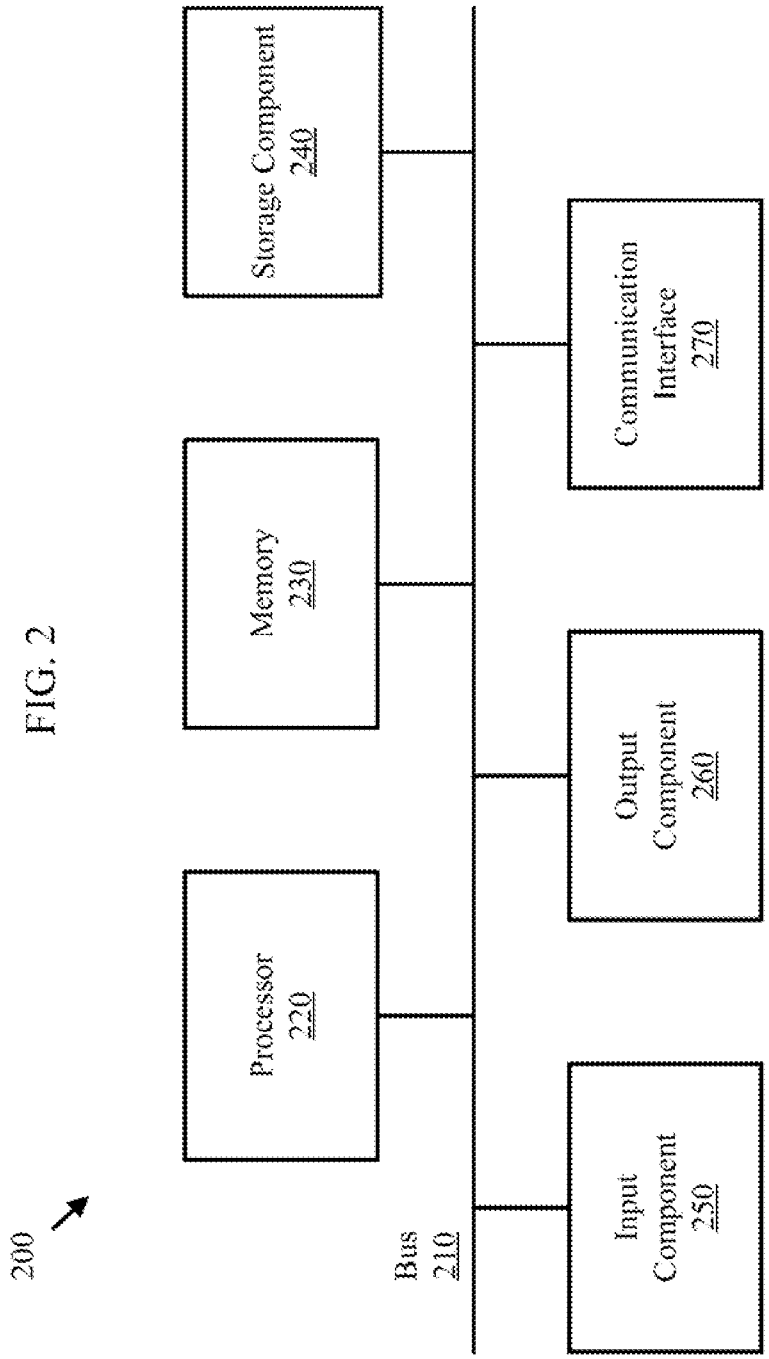
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
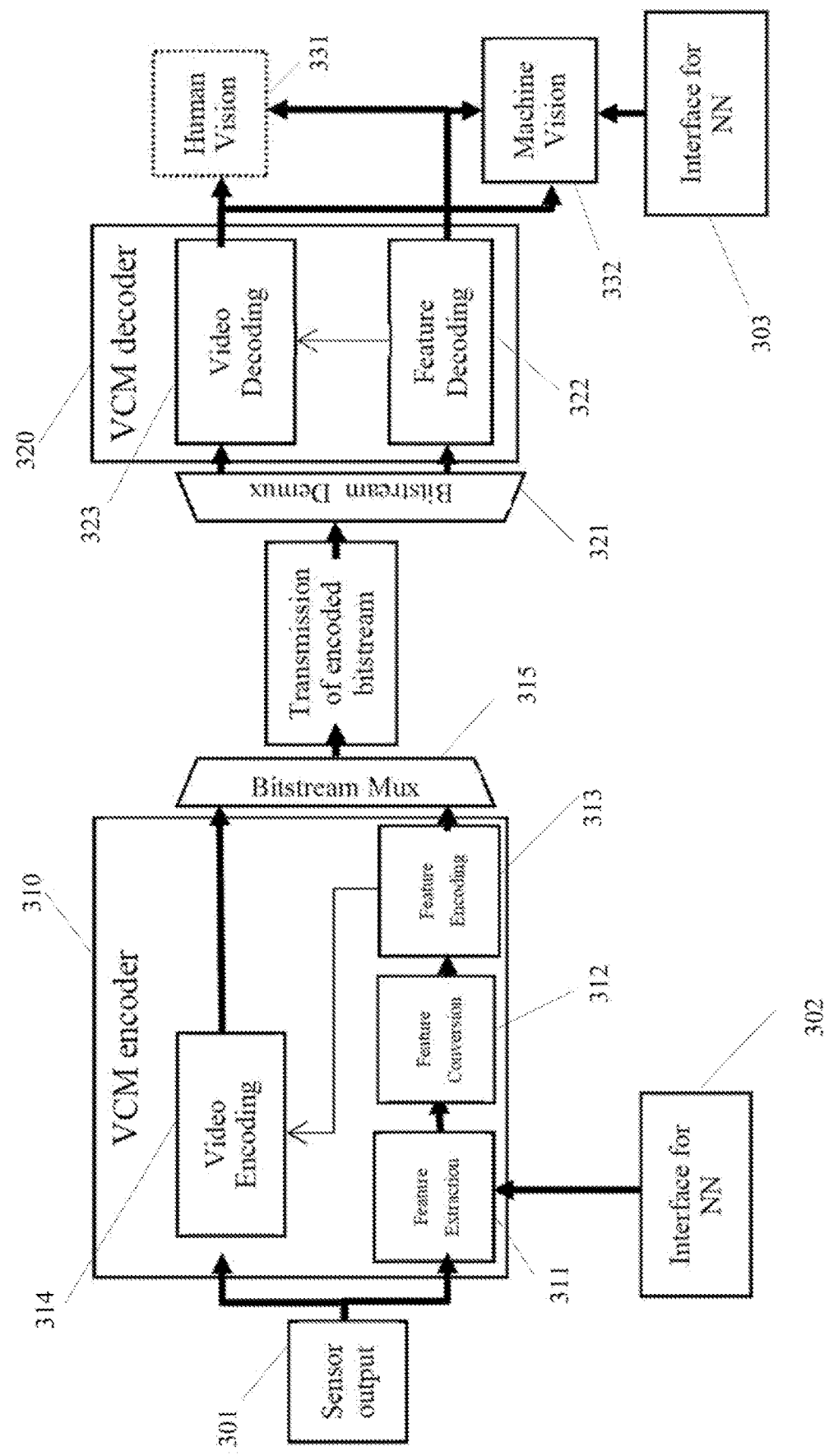
FIG. 3 is a block diagram of an example architecture for performing video coding, according to embodiments.

FIG. 3 is a block diagram of an example architecture 300 for performing video coding, according to embodiments. In embodiments, the architecture 300 may be a video coding for machines (VCM) architecture, or an architecture that is otherwise compatible with or configured to perform VCM coding. For example, architecture 300 may be compatible with "Use cases and requirements for Video Coding for Machines" (ISO/IEC JTC 1/SC 29/WG 2 N18), "Draft of Evaluation Framework for Video Coding for Machines" (ISO/IEC JTC 1/SC 29/WG 2 N19), and "Call for Evidence for Video Coding for Machines" (ISO/IEC JTC 1/SC 29/WG 2 N20), the disclosures of which are incorporated by reference herein in their entireties.

In embodiments, one or more of the elements illustrated in FIG. 3 may correspond to, or be implemented by, one or more of the elements discussed above with respect to FIGS. 1-2, for example one ore more of the user device 110, the platform 120, the device 200, or any of the elements included therein.

As can be seen in FIG. 3, the architecture 300 may include a VCM encoder 310 and a VCM decoder 320. In embodiments, the VCM encoder may receive sensor input 301, which may include for example one or more input images, or an input video. The sensor input 301 may be provided to a feature extraction module 311 which may extract features from the sensor input, and the extracted features may be converted using feature conversion module 312, and encoded using feature encoding module 313. In embodiments, the term "encoding" may include, may correspond to, or may be used interchangeably with, the term "compressing". The architecture 300 may include an interface 302, which may allow the feature extraction module 311 to interface with a neural network (NN) which may assist in performing the feature extraction.

The sensor input 301 may be provided to a video encoding module 314, which may generate an encoded video. In embodiments, after the features are extracted, converted, and encoded, the encoded features may be provided to the video encoding module 314, which may use the encoded features to assist in generating the encoded video. In embodiments, the video encoding module 314 may output the encoded video as an encoded video bitstream, and the feature encoding module 313 may output the encoded features as an encoded feature bitstream. In embodiments, the VCM encoder 310 may provide both the encoded video bitstream and the encoded feature bitstream to a bitstream multiplexer 315, which may generate an encoded bitstream by combining the encoded video bitstream and the encoded feature bitstream.

In embodiments, the encoded bitstream may be received by a bitstream demultiplexer (demux), which may separate the encoded bitstream into the encoded video bitstream and the encoded feature bitstream, which may be provided to the VCM decoder 320. The encoded feature bitstream may be provided to the feature decoding module 322, which may generate decoded features, and the encoded video bitstream may be provided to the video decoding module, which may generate a decoded video. In embodiments, the decoded features may also be provided to the video decoding module 323, which may use the decoded features to assist in generating the decoded video.

In embodiments, the output of the video decoding module 323 and the feature decoding module 322 may be used mainly for machine consumption, for example machine vision module 332. In embodiments, the output can also be used for human consumption, illustrated in FIG. 3 as human vision module 331. A VCM system, for example the architecture 300, from the client end, for example from the side of the VCM decoder 320, may perform video decoding to obtain the video in the sample domain first. Then one or more machine tasks to understand the video content may be performed, for example by machine vision module 332. In embodiments, the architecture 300 may include an interface 303, which may allow the machine vision module 332 to interface with an NN which may assist in performing the one or more machine tasks.

As can be seen in FIG. 3, in addition to a video encoding and decoding path, which includes the video encoding module 314 and the video decoding module 323, another path included in the architecture 300 may be a feature extraction, feature encoding, and feature decoding path, which includes the feature extraction module 311, the feature conversion module 312, the feature encoding module 313, and the feature decoding module 322.

Figure 4:
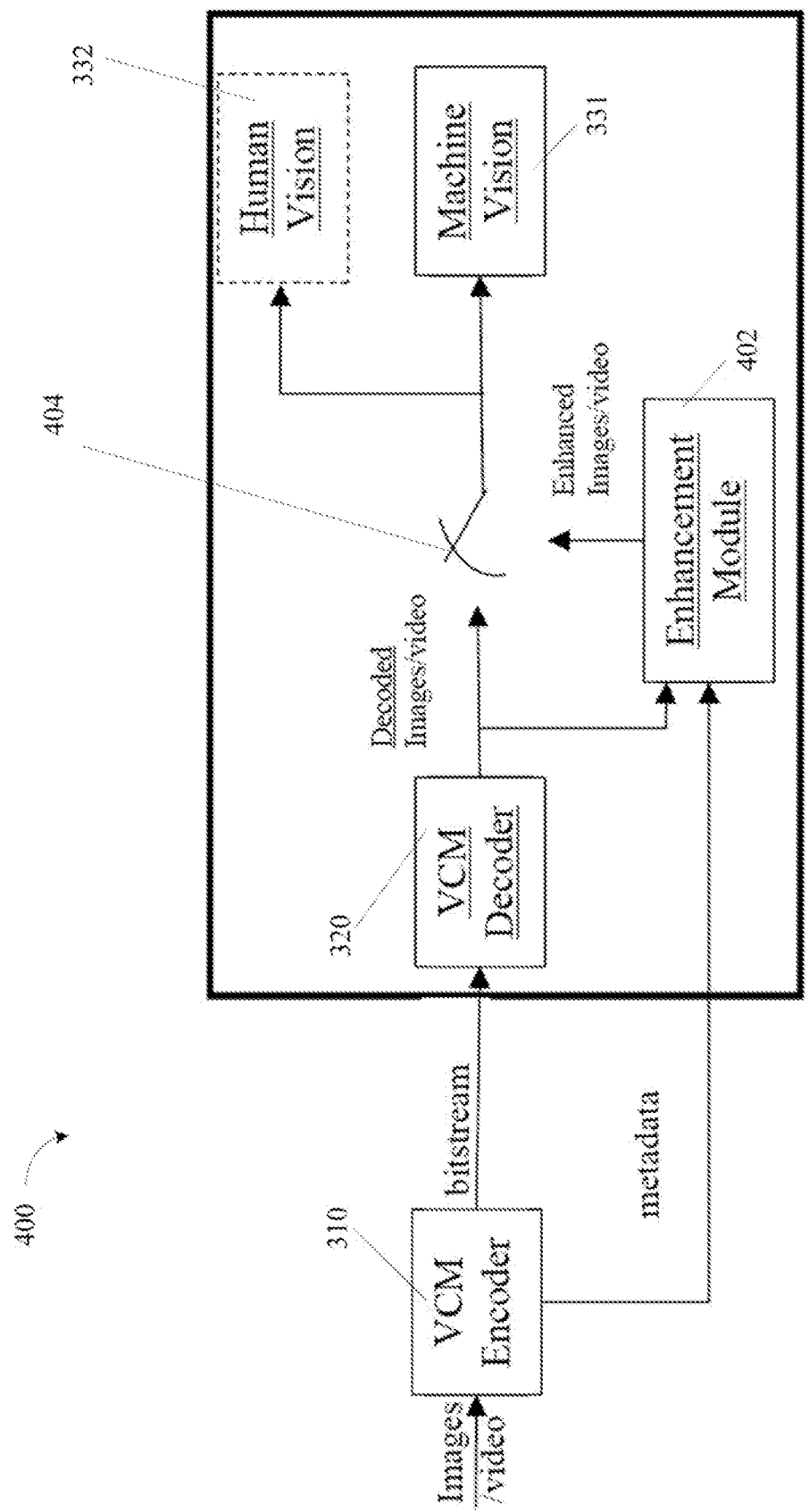
FIG. 4 is a block diagram of an example architecture, including an enhancement module, for performing video coding, according to embodiments.

Embodiments may relate to methods for enhancing decoded video for machine vision, human vision, or human/machine hybrid vision. In embodiments, each decoded image, which may be generated for example by the VCM decoder 320, may be enhanced for machine vision or human vision using an enhancement module and metadata sent from the encoder side. In embodiments, these methods can be applied to any VCM codec. Although some embodiments may be described using broader terms such as "image/video", or using more specific terms such as "image" and "video", it may be understood that embodiments may be applied FIG. 4 is a block diagram of an example architecture 400 for performing video coding, according to embodiments. As shown in FIG. 4, the architecture 400 may include an enhancement module 402. The output of the VCM decoder 320, for decoded images/videos, and metadata generated by the VCM encoder 310, may be fed into the enhancement module 402 to generate enhanced images and/or enhanced videos, which can be used for a machine vision task or a human vision task. In embodiments, the metadata may include parameters for the enhancement module 402, which may be referred to for example as enhancement parameters. In embodiments, the enhancement parameters may be, for example, parameters used to configure the enhancement module 402 to perform enhancement processing, for example the processing described below. In embodiments, the enhancement module 402 may be an image/video processing module. In embodiments, the enhancement module 402 may be a neural network-based processing module. Depending on the vision task, the decoded images/videos, or the enhanced images/videos, may be selected and fed into the human vision module 331 and the machine vision module 332. This selection is illustrated in FIG. 4 using switch 404, however embodiments are not limited thereto, and other techniques for selectively providing the decoded images/videos and the enhanced images/videos may be used.

In embodiments, the transmission of the metadata may be optional. For example, if the decoded images/videos are used by the machine vision module 332, the decoder side can inform the VCM encoder 310 not to send the metadata because it will not be used.

In embodiments, the enhancement parameters may be fixed, and therefore there may be no need to send the metadata.

In embodiments, the VCM encoder 310 and the VCM decoder 320 may be optimized for machine tasks, for example tasks corresponding to the machine vision module 332. In embodiments, the enhancement module 402 may be designed to improve the decoded images/videos for human vision tasks, for example tasks corresponding to the human vision module 331. In embodiments, the enhancement module 402 may be designed to further improve the decoded images/videos for machine vision tasks. In embodiments, the enhancement module 402 may be designed to improve the decoded images/videos for hybrid machine/human vision tasks, for example tasks corresponding to both of the machine vision module 332 and the human vision module 331. For different tasks, the enhancement parameters can be different.

In embodiments, the enhancement module 402 may be or include a neural network, and the VCM encoder 310 may optimize the parameters of the neural network for better performance for the machine vision tasks, the human vision tasks, or the hybrid machine/human vision tasks. In embodiments, a rate-distortion optimization approach can be used. In embodiments, the parameters of the neural network may be optimized based on the enhancement parameters provided by the VCM encoder 310, for example the metadata. In embodiments, the parameters of the neural network may be directly included in the enhancement parameters. In embodiments, the enhancement parameters may specify modifications to the neural network parameters, or may include information which allows the neural network parameters to be derived.

Figure 5:
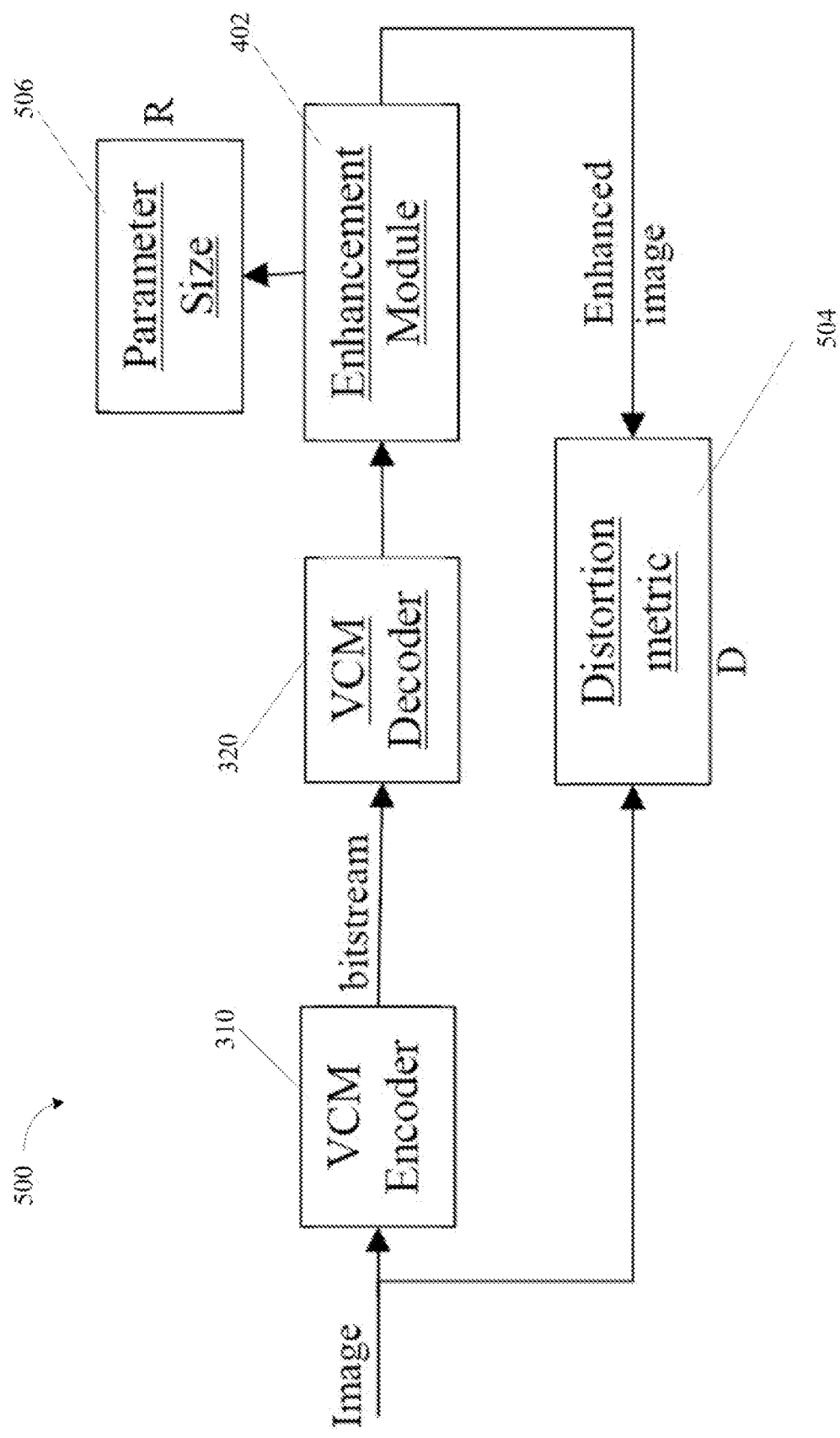
FIG. 5 is a block diagram of an example architecture, including an enhancement module, for performing video coding, according to embodiments.

FIG. 5 is a block diagram of an example architecture 500 for performing video coding, according to embodiments. As shown in FIG. 5, architecture 500 may include the enhancement module 402, and may be configured to perform image enhancement and/or video enhancement using a rate-distortion optimization approach.

In embodiments, a rate distortion optimization process may be carried out at the encoder side, for example by the VCM encoder 310 or other elements associated with the VCM encoder 310. In embodiments, a distortion metric D between the input image and its corresponding enhanced image may be computed, and the parameter size for the enhancement parameters, R, may be determined. The overall loss function $L_{loss}$ may be expressed using Equation 1 below.

$$L_{loss}=R+\lambda D \quad \text{(Equation 1)}$$

In Equation 1, λ may be used to set a trade-off the distortion D and rate R. Although FIG. 5 is illustrated as relating to images, it may be understood that embodiments may also be applied to videos, for example by treating a video as a sequence of images when computing the distortion metric.

In embodiments, the VCM encoder 310 may optimize enhancement parameters using a gradient descent method or variants thereof. In embodiments, the optimized enhancement parameters may be obtained per image, and may be the metadata, or may be included in the metadata, which is sent to the decoder side. In embodiments, the enhancement parameters may be fixed for multiple images, such as a group of images, for example a group of pictures (GOP). For example, the distortion metric may be set as the average distortion for the GOP or group of images. The metadata, for example the enhancement parameters, may be shared in the GOP. Thus, the metadata size can be reduced.

For human vision, the distortion metric may include one or more of mean square error (MSE), 1−ssim, or 1−ms_ssim, where ssim denotes the structure similarity metric (SSIM) between the input image and the enhanced image, and ms_ssim denotes the multi-scale structure similarity metric (MS-SSIM) between the input image and the enhanced image.

For machine vision, 1−ssim or 1−ms_ssim may also be used because ssim or ms_ssim may correlate well with better performance for machine vision tasks.

Figure 6:
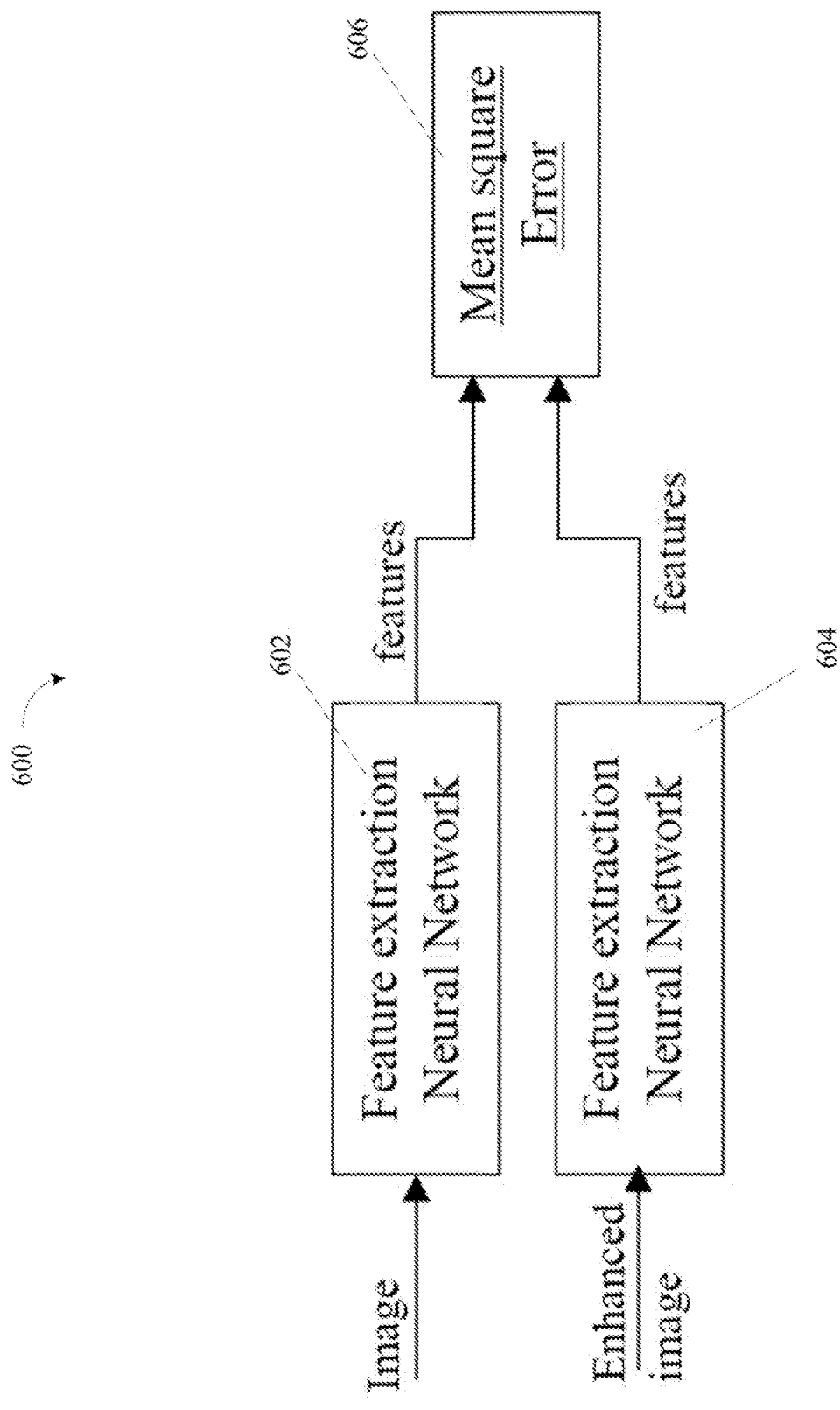
FIG. 6 is a block diagram of a module for determining a mean square error, according to embodiments.

FIG. 6 is a block diagram of an error determination module 600, according to embodiments. In embodiments, the error determination module 600 may be used to determine an MSE in feature space between an enhanced image and an input image. In embodiments, the MSE in feature space can be used as the distortion metric for machine vision. As shown in FIG. 6, the error determination module may include a feature extraction neural network 602, which may be used to extract features from the input image, and a feature extraction neural network 604, which may be used to extract features from the enhanced image. In embodiments, one or more of the feature extraction neural network 602 and the feature extraction neural network 604 may correspond to one or more elements included in the VCM encoder 310, for example the feature extraction module 311. In embodiments, the MSE may be calculated by MSE module 606, for example according to Equation 2 below:

$$MSE = \frac{1}{C \times W \times H} \sum_{c=0}^{C-1} \sum_{h=0}^{H-1} \sum_{w=0}^{W-1} \left( f(c, h, w) - \hat{f}(c, h, w) \right)^2 \quad \text{(Equation 2)}$$

In Equation 2 above, f(c, h, w) represents the features of the input image and $\hat{f}$(c, h, w) represents the features of the enhanced image, c is represents a channel index, (h, w) represents the position of a given feature in row and column. C represents the number of channels of the feature map, W represents the number of rows of the feature map, and H represents the number of columns of the feature map.

In FIG. 6, the feature extraction neural networks 602 and 604 may be simple, for example the first few layers of a machine task network. In embodiments, if a machine analysis network is known at the encoder side, it may be beneficial to use a first few layers of the given machine analysis network as at least one of the feature extraction neural networks 602 and 604. In embodiments, if the machine analysis network is unknown at the encoder side, the first few layers of a commonly used machine analysis network, such as Faster R-CNN or Mask R-CNN, VGG-16 etc., may be used as at least one of the feature extraction neural networks 602 and 604.

In embodiments, there may be multiple ways to send metadata representing the parameters of the enhancement module 402. FIGS. 7A-7D are diagrams illustrating examples of bitstreams which include metadata representing the enhancement parameters, according to embodiments In embodiments, the metadata for a particular image may be included in the bitstream which includes coded image data corresponding to the particular image. For example, a bitstream including image data for image 1 through image k may also include corresponding metadata, for example at least one of metadata 1 through metadata k.

In embodiments, within the bitstream, a portion of the bitstream corresponding to image 1 may be attached to, adjacent to, or otherwise associated with, a portion of the bitstream corresponding to metadata for image 1, and so on for image 2 through image k, as shown in FIG. 7A.

In embodiments, the metadata can be selectively included. For example, a flag F may be used to indicate whether metadata is attached for a particular image, as shown for example in FIG. 7B. In embodiments, if the metadata is not attached to a given image, the enhancement parameters may be not changed. Otherwise, the enhancement parameters may be changed according to the information in metadata. An example of such arrangement is shown in FIG. 7B. As can be seen in FIG. 7B, each image may have a corresponding flag F which indicates whether the bitstream includes metadata such as enhancement parameters for the image.

In embodiments the flag F may be represented by a single bit because it has value of 0 or 1, and so the overhead introduced by the flag F may be small. To further reduce the overhead, the flag F may be entropy coded with or without a context model. In embodiments, the flag F may be represented by one byte, or using multiple bits indicating which set of decoder-known parameters should be used. This may be be helpful when a decoder, for example VCM decoder 320 or enhancement module 402, has stored or received more than one set of enhancement parameters.

In embodiments, the selective attachment of metadata may be used to carry metadata for a case in which a GOP has one set of metadata and a GOP size can be flexible. In embodiments, if the GOP size is fixed, for example if every GOP contains K pictures, the metadata may be attached at the beginning or at the end of every K-th picture without using the flag F.

As shown in FIGS. 7A and 7B, the metadata and the flag F may be attached or included after the bitstream for the corresponding image, however embodiments are not limited thereto. For example, in another embodiment, the flag F may be placed before the corresponding bitstream, or both the flag F and the associated metadata may be placed before the corresponding bitstream.

In embodiments, the metadata may be be sent separately from the main bitstream for the coded images/videos, for example in a separate bitstream. For example, FIG. 7C shows an example of a metadata bitstream in which metadata for each of image 1 through image k, and FIG. 7D shows an example of a metadata bitstream in the flag F is used to signal whether metadata is present for a particular image.

As discussed above, the enhancement module 402 may be a neural network, according to embodiments. Depending on the implementation complexity and performance requirement, the enhancement module 402 may be simple or complex.

Figure 8:
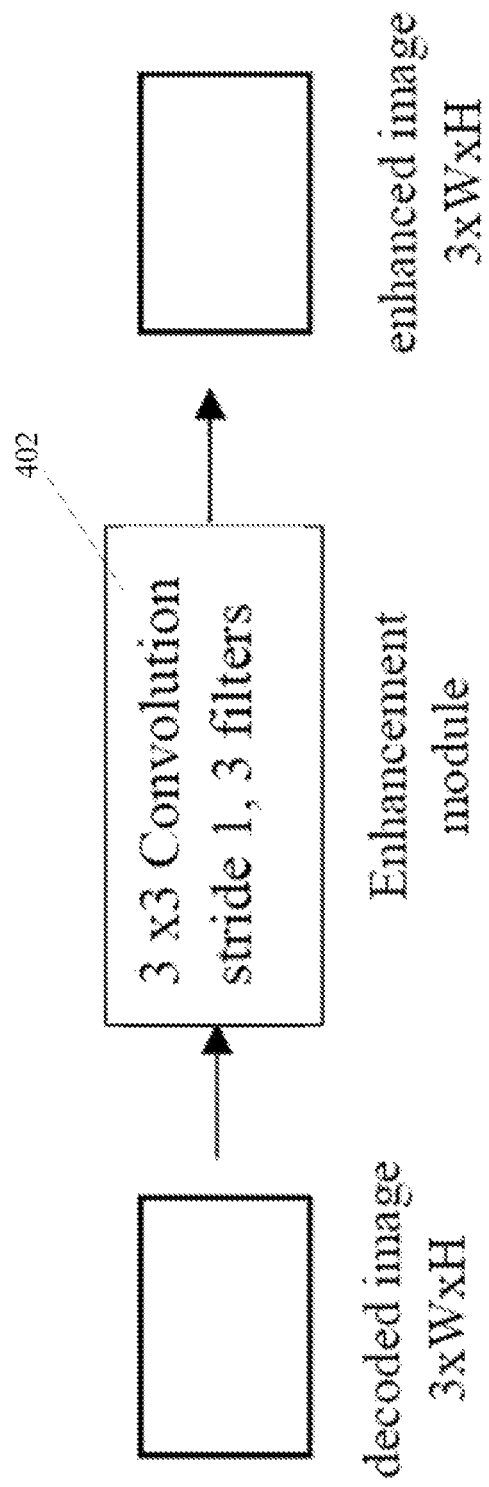
FIG. 8 is a block diagram of an example enhancement module, according to embodiments.

FIG. 8 illustrates a diagram of an example enhancement module 402 which may be relatively simple. For example, the enhancement module 402 may include a simple convolution layer having a kernel size of 3×3 and a stride of 1, as shown in FIG. 8.

In the enhancement module 402 shown in FIG. 8, color images may be used and therefore both the decoded and enhance image sizes are 3×W×H, where 3 denotes the three color channels, for example in RGB, YCrCb, or other color formats. For the enhancement module 402 shown in FIG. 8, 3 filters may be used, and each filter may contains 3×3×3 weight values and 1 bias value. Thus a total of 84 parameters, for example 3×3×3×3+3=84, may be used.

In embodiments, if a bitrate of a bitstream generated by the VCM encoder 310 is high, the parameter size of the enhancement parameters may be larger, as compared to the low rate case. For example, for high bitrate case, a convolution kernel may be 5×5 or 7×7, compared to 3×3 for a low rate case as shown for example in FIG. 8.

In general, neural network parameters may be denoted as 32 bit floating-point numbers. In embodiments, the enhancement parameters can be expressed with lower bit depth accuracy, such as 16-bit floating-point numbers, to reduce the metadata size. In embodiments, the enhancement parameters for a k-th image may be denoted as as $\{\theta_0^{(k)}, \theta_1^{(k)}, \ldots, \theta_{N-1}^{(k)}\}$ for $k=1, 2, \ldots$, where N denotes the total number of enhancement parameters.

In embodiments, the N numbers may be transmitted as metadata, or the difference between the enhancement parameters of k-th images and a fixed set of module parameters may be transmitted as metadata, for example as $\{\theta_0^{(k)}, \theta_1^{(k)}, \ldots, \theta_{N-1}^{(k)}\}$. For example, a set of numbers determined according to Equation 3 below may be transmitted as the metadata:

$$\{\theta_0^{(k)}-\theta_0^{(0)}, \theta_1^{(k)}-\theta_1^{(0)}, \ldots, \theta_{N-1}^{(k)}-\theta_{N-1}^{(0)}\} \quad \text{(Equation 3)}$$

In embodiments, the difference between new enhancement parameters and one set of known parameters may be transmitted as metadata. For example the difference between k-th images and the parameters of its previous images, determined according to Equation 4 below, may be transmitted as the metadata:

$$\{\theta_0^{(k)}-\theta_0^{(k-1)}, \theta_1^{(k)}-\theta_1^{(k-1)}, \ldots, \theta_{N-1}^{(k-1)}-\theta_{N-1}^{(k-1)}\} \quad \text{(Equation 4)}$$

Equations 3 and 4 above may correspond to embodiments in which metadata are sent for each image, however embodiments are not limited thereto. For example, similar methods may be applied to the case when metadata are selected attached to images or metadata are shared within a GOP.

Figure 9:
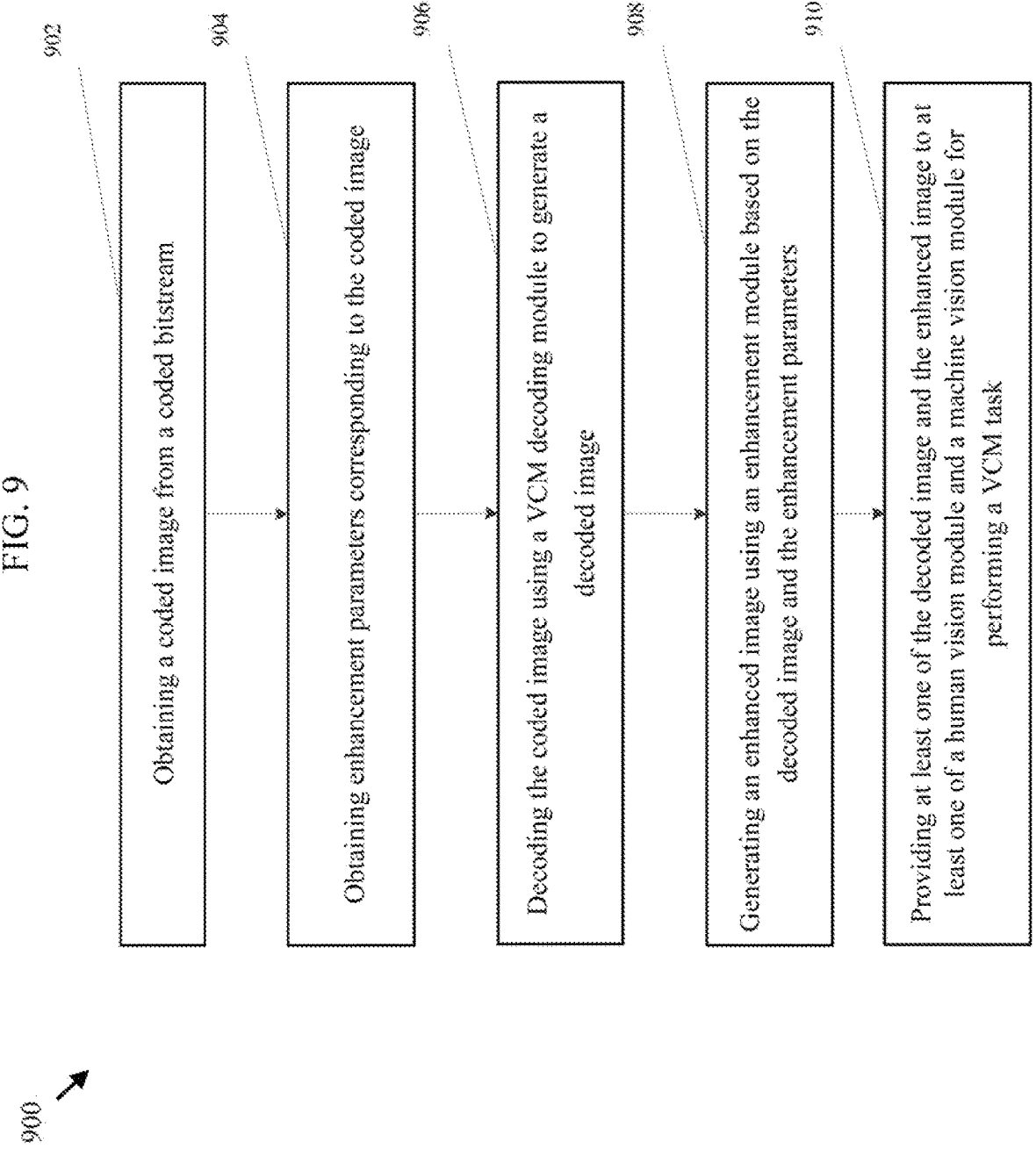
FIG. 9 is a flowchart of an example process for performing feature compression, according to embodiments.

As shown in FIG. 9, process 900 may include obtaining a coded image from a coded bitstream (block 902).

As further shown in FIG. 9, process 900 may include obtaining enhancement parameters corresponding to the coded image (block 904). In embodiments, the enhancement parameters may correspond to the enhancement parameters discussed above. In embodiments, the enhancement parameters may be optimized for at least one of a human vision VCM task, a machine vision VCM task, and a human-machine hybrid vision VCM task.

As further shown in FIG. 9, process 900 may include decoding the coded image using a VCM decoding module to generate a decoded image (block 906). In embodiments, the VCM decoding module may correspond to VCM decoder 320 discussed above.

As further shown in FIG. 9, process 900 may include generating an enhanced image using an enhancement module based on the decoded image and the enhancement parameters (block 908). In embodiments, the enhancement module may correspond to enhancement module 402 discussed above.

As further shown in FIG. 9, process 900 may include providing at least one of the decoded image and the enhanced image to at least one of a human vision module and a machine vision module for performing a VCM task, for example the one of the human vision VCM task, the machine vision VCM task, and the human-machine hybrid vision VCM task (block 910). In embodiments, the human vision module may correspond to human vision module 331, and the machine vision module may correspond to machine vision module 332 discussed above.

In embodiments, the enhancement module may include a neural network, and the enhancement parameters may include neural network parameters corresponding to the neural network.

In embodiments, the enhanced image may be generating using rate-distortion optimization, and the neural network parameters may be selected based on a distortion metric and a parameter size.

In embodiments, the distortion metric may include at least one from among a mean square error, a structure similarity metric, and a multi-scale structure similarity metric associated with the enhanced image and an input image.

In embodiments, the mean square error may be calculated using Equation 2 discussed above.

In embodiments, the decoded image may be included in a group of pictures (GOP) corresponding to the coded bitstream, and all images included in the GOP share the enhancement parameters.

In embodiments, the enhancement parameters may be included in the coded bitstream.

In embodiments, the coded bitstream may include a flag corresponding to the coded image, and the flag may indicate whether the enhancement parameters corresponding to the coded image are included in the coded bitstream.

In embodiments, the enhancement parameters may be included in a metadata bitstream which is separate from the coded bitstream.

In embodiments, the metadata bitstream may include a flag corresponding to the coded image, and the flag may indicate whether the enhancement parameters corresponding to the coded image are included in the metadata bitstream.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of performing video coding for machine (VCM) image enhancement, the method being executed by at least one processor and comprising:
    obtaining a coded image from a coded bitstream;
    obtaining enhancement parameters corresponding to the coded image;
    decoding the coded image using a VCM decoding module to generate a decoded image;
    generating an enhanced image using an enhancement module based on the decoded image and the enhancement parameters, wherein the enhancement parameters are optimized for one of a human vision VCM task, a machine vision VCM task, an d a human-machine hybrid vision VCM task, the enhancement module comprises a neural network, the enhancement parameters comprise neural network parameters corresponding to the neural network, the enhanced image is generated using rate-distortion optimization, the neural network parameters are selected based on a distortion metric and a parameter size, the distortion metric comprises at least one from among a mean square error, a structure similarity metric, and a multi-scale structure similarity metric associated with the enhanced image and the input image; and
    providing at least one of the decoded image and the enhanced image to at least one of a human vision module and a machine vision module for performing the one of the human vision VCM task, the machine vision VCM task, and the human-machine hybrid vision VCM task,
    wherein the enhancement parameters are based on features of an input image, features of the enhanced image, a number of channels of a feature map, a number of rows of the feature map, a number of columns of the feature map, a channel index, a row, and a column position, and
    the mean square error is calculated using a following equation:

$$MSE = \frac{1}{C \times W \times H} \sum_{c=0}^{C-1} \sum_{h=0}^{H-1} \sum_{w=0}^{W-1} (f(c, h, w) - \hat{f}(c, h, w))^2,$$

where MSE represents the mean square error, f (c, h, w) represents the features of the input image, f̂(c, h, w) represents the features of the enhanced image, C represents the number of channels of the feature map, H represents the number of the rows of the feature map, W represents the number of the columns of the feature map, c represents the channel index, h represents the row, and w represents the column position.

2. The method of claim 1, wherein the decoded image is included in a group of pictures (GOP) corresponding to the coded bitstream, and
    wherein all images included in the GOP share the enhancement parameters.

3. The method of claim 1, wherein the enhancement parameters are included in the coded bitstream.

4. The method of claim 3, wherein the coded bitstream comprises a flag corresponding to the coded image, and
    wherein the flag indicates whether the enhancement parameters corresponding to the coded image are included in the coded bitstream.

5. The method of claim 1, wherein the enhancement parameters are included in a metadata bitstream which is separate from the coded bitstream.

6. The method of claim 5, wherein the metadata bitstream comprises a flag corresponding to the coded image, and
    wherein the flag indicates whether the enhancement parameters corresponding to the coded image are included in the metadata bitstream.

7. A device for performing video coding for machine (VCM) image enhancement, the device comprising:
    at least one memory configured to store program code; and
    at least one processor configured to read the program code and operate as instructed by the program code, the program code including:
        first obtaining code configured to cause the at least one processor to obtain a coded image from a coded bitstream;
        second obtaining code configured to cause the at least one processor to obtain enhancement parameters corresponding to the coded image;
        decoding code configured to cause the at least one processor to decode the coded image using a VCM decoding module to generate a decoded image;
        first generating code configured to cause the at least one processor to generate an enhanced image using an enhancement module based on the decoded image and the enhancement parameters, wherein the enhancement parameters are optimized for one of a human vision VCM task, a machine vision VCM task, an d a human-machine hybrid vision VCM task, the enhancement module comprises a neural network, the enhancement parameters comprise neural network parameters corresponding to the neural network, the enhanced image is generated using rate-distortion optimization, the neural network parameters are selected based on a distortion metric and a parameter size, the distortion metric comprises at least one from among a mean square error, a structure similarity metric, and a multi-scale structure similarity metric associated with the enhanced image and the input image; and providing code configured to cause the at least one processor to provide at least one of the decoded image and the enhanced image to at least one of a human vision module and a machine vision module for performing the one of the human vision VCM task, the machine vision VCM task, and the human-machine hybrid vision VCM task, wherein the enhancement parameters are based on features of an input image, features of the enhanced image, a number of channels of a feature map, a number of rows of the feature map, a number of columns of the feature map, a channel index, a row, and a column position, and the mean square error is calculated using a following equation:

$$MSE = \frac{1}{C \times W \times H} \sum_{c=0}^{C-1} \sum_{h=0}^{H-1} \sum_{w=0}^{w-1} (f(c, h, w) - \hat{f}(c, h, w))^2,$$

where MSE represents the mean square error, f (c, h, w) represents the features of the input image, f̂(c, h, w) represents the features of the enhanced image, C represents the number of channels of the feature map, H represents the number of the rows of the feature map, W represents the number of the columns of the feature map, c represents the channel index, h represents the row, and w represents the column position.

8. The device of claim 7, wherein the decoded image is included in a group of pictures (GOP) corresponding to the coded bitstream, and
wherein all images included in the GOP share the enhancement parameters.

9. The device of claim 7, wherein the enhancement parameters are included in the coded bitstream.

10. The device of claim 9, wherein the coded bitstream comprises a flag corresponding to the coded image, and
wherein the flag indicates whether the enhancement parameters corresponding to the coded image are included in the coded bitstream.

11. The device of claim 7, wherein the enhancement parameters are included in a metadata bitstream which is separate from the coded bitstream.

12. The device of claim 11, wherein the metadata bitstream comprises a flag corresponding to the coded image, and
wherein the flag indicates whether the enhancement parameters corresponding to the coded image are included in the metadata bitstream.

13. A non-transitory computer-readable medium storing instructions, the instructions comprising: one or more instructions that, when executed by one or more processors of a device for video coding for machine (VCM) image enhancement, cause the one or more processors to:
obtain a coded image from a coded bitstream;
obtain enhancement parameters corresponding to the coded image;
decode the coded image using a VCM decoding module to generate a decoded image;
generate an enhanced image using an enhancement module based on the decoded image and the enhancement parameters, wherein the enhancement parameters are optimized for one of a human vision VCM task, a machine vision VCM task, an d a human-machine hybrid vision VCM task, the enhancement module comprises a neural network, the enhancement parameters comprise neural network parameters corresponding to the neural network, the enhanced image is generated using rate-distortion optimization, the neural network parameters are selected based on a distortion metric and a parameter size, the distortion metric comprises at least one from among a mean square error, a structure similarity metric, and a multi-scale structure similarity metric associated with the enhanced image and the input image; and
provide at least one of the decoded image and the enhanced image to at least one of a human vision module and a machine vision module for performing the one of the human vision VCM task, the machine vision VCM task, and the human-machine hybrid vision VCM task,
wherein the enhancement parameters are based on features of an input image, features of the enhanced image, a number of channels of a feature map, a number of rows of the feature map, a number of columns of the feature map, a channel index, a row, and a column position, and
the mean square error is calculated using a following equation:

$$MSE = \frac{1}{C \times W \times H} \sum_{c=0}^{C-1} \sum_{h=0}^{H-1} \sum_{w=0}^{w-1} (f(c, h, w) - \hat{f}(c, h, w))^2,$$

where MSE represents the mean square error, f (c, h, w) represents the features of the input image, f̂(c, h, w) represents the features of the enhanced image, C represents the number of channels of the feature map, H represents the number of the rows of the feature map, W represents the number of the columns of the feature map, c represents the channel index, h represents the row, and w represents the column position.

* * * * *